United States Patent
Lee et al.

(10) Patent No.: US 6,233,144 B1
(45) Date of Patent: May 15, 2001

(54) OUTWARD PUSHING DEVICE AND AN EXPANSION DEVICE ADAPTED TO THE OUTWARD PUSHING DEVICE

(75) Inventors: Chia-Chun Lee; Chih-Wen Chiang, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/079,267

(22) Filed: May 15, 1998

(51) Int. Cl.[7] ........................................ G06F 1/16
(52) U.S. Cl. ........................ 361/686; 361/679; 361/683
(58) Field of Search ............................. 361/686, 683, 361/679

(56) References Cited

U.S. PATENT DOCUMENTS 5,838,539 * 11/1998 Doss et al. ........................ 361/686
6,061,233 * 5/2000 Jung .................................... 361/686

* cited by examiner

*Primary Examiner*—Lee P. Picard
*Assistant Examiner*—Yean-Hsi Chang
(74) *Attorney, Agent, or Firm*—Bacon & Thomas, PLLC

(57) ABSTRACT

An outward pushing device and an expansion device adapted to the outward pushing device. The pushing device is pivotally connected with two sides of the expansion device. The pushing device includes a handle section and a pushing section connected with each other. When shifting the handle section to exert a torque onto the pushing section, the pushing section is forced to push and separate the portable computer from the expansion device. The pushing device is disposed with gaps to help in dissipating of the heat generated by the portable computer. The seat body of the expansion device is disposed with adjustable slide rails and the bottom of the portable computer is disposed with slide channels so as to facilitate pushing of the portable computer.

3 Claims, 4 Drawing Sheets

OUTWARD PUSHING DEVICE AND AN EXPANSION DEVICE ADAPTED TO THE OUTWARD PUSHING DEVICE

BACKGROUND OF THE INVENTION

The present invention relates to an outward pushing device and an expansion device adapted to the outward pushing device, which enables a user to push and electrically connect the portable computer with the expansion device in a more strength-saving manner. In addition, by means of the pushing device, the user can more conveniently and easily push the portable computer out of the expansion device. Also, the pushing device helps in dissipating of the heat generated by the portable computer.

In conventional portable computer and expansion device, the rejecting mechanism employs a linkage to drive the pushing members disposed on two sides of the expansion device for pushing and separating the portable computer from the expansion device. Such linkage and pushing members have quite complicated structure and include numerous parts. Moreover, it is quite troublesome and time-consuming to assemble these parts. Therefore, it is necessary to develope an outward Pushing device and an expansion device adapted to the outward pushing device, which enables a user to push and electrically connect the portable computer with the expansion device and push and separate the portable computer from the expansion device in a more strength-saving manner.

SUMMARY OF THE INVENTION

It is a primary object of the present invention to provide an outward pushing device and an expansion device adapted to the outward pushing device, which has simple structure and less components and thus can be easily assembled. The pushing device and expansion device enables a user to push and separate the portable computer with the expansion device in a more strength-saving manner. In the case that the force exerted onto the pushing device by the user is not unified, the portable computer can be still rejected out of the expansion device almost at the same speed.

It is a further object of the present invention to provide the above outward pushing device and expansion device in which the seat body of the expansion device is disposed with at least one slide rail and the bottom of the portable computer is correspondingly disposed with slide channel in which the slide rail is slidably fitted. By means of the slide rail and slide channel, the frictional force between the portable computer and the seat body is reduced, permitting a user to push and electrically connect the portable computer with the expansion device in p more strength-saving manner.

It is still a further object of the present invention to provide the above outward pushing device and expansion device in which when the portable computer is used with the expansion device, the execution speed of the portable computer will be increased. Therefore, more heat will be generated than that of the solely used portable computer. Therefore, the pushing device is disposed in an independent receiving chamber of the expansion device and formed with multiple pushing plates at intervals. Through the intervals, the heat generated from the back side of the portable computer can be dissipated out of the portable computer.

It is still a further object of the present invention to provide the above outward pushing device and expansion device in which the seat body is disposed with a guiding member, whereby a user can quickly and accurately aim the slide channel of the portable computer at the slide rail of the seat body and easily electrically connect the portable computer with the expansion device.

The present invention can be best understood through the following description and accompanying drawings, wherein:

DETAILED DESCRIPTION OF THE PREFERRED EMBODIMENTS

Figure 1:
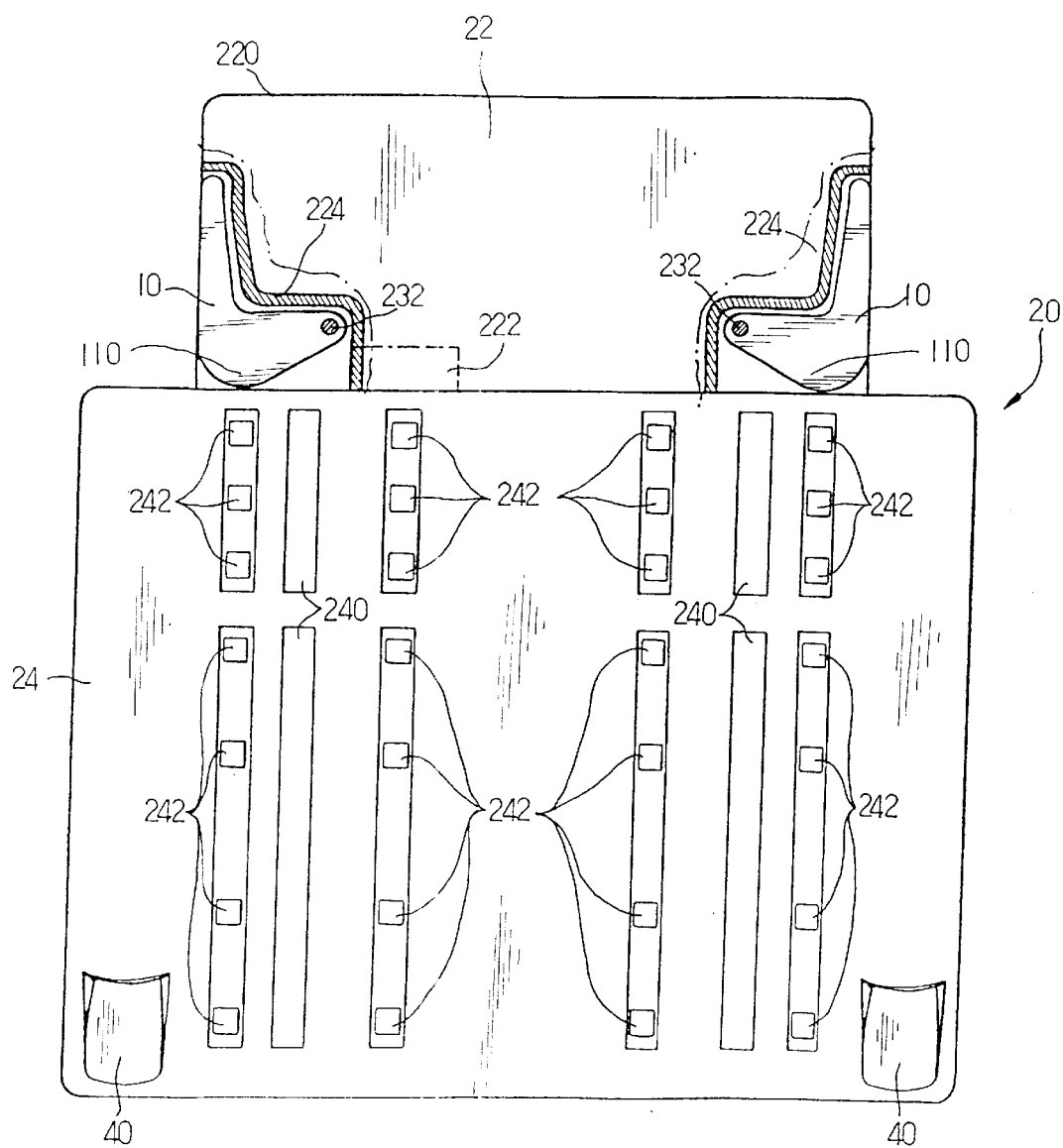
FIG. 1 is a partially sectional view of the expansion device equipped with the outward pushing device of the present invention.

Please refer to FIG. 1. The present invention includes an outward pushing device 10 and an expansion device 20 adapted thereto. The expansion device 20 serves as an adaptation interface for expanding the function of portable computer 30 (referring to FIG. 2) and peripheral equipment thereof. The expansion device 20 can be a docking or a replicator. The expansion device 20 is generally composed of an electrically connecting unit 22 and a seat body 24. Alternatively, the expansion device 20 can solely include an electrically connecting unit 22.

The electrically connecting unit 22 is composed of a housing 220 and various kinds of transmission interfaces received therein, such as sound, multi-media, keyboard and printer (not shown). The input ends of the transmission interfaces are electrically connected with each other to form an input port 222 which is electrically connected with an output port 300 of a portable computer 30. The seat body 24 serves to retain the portable computer 30.

Figure 2:
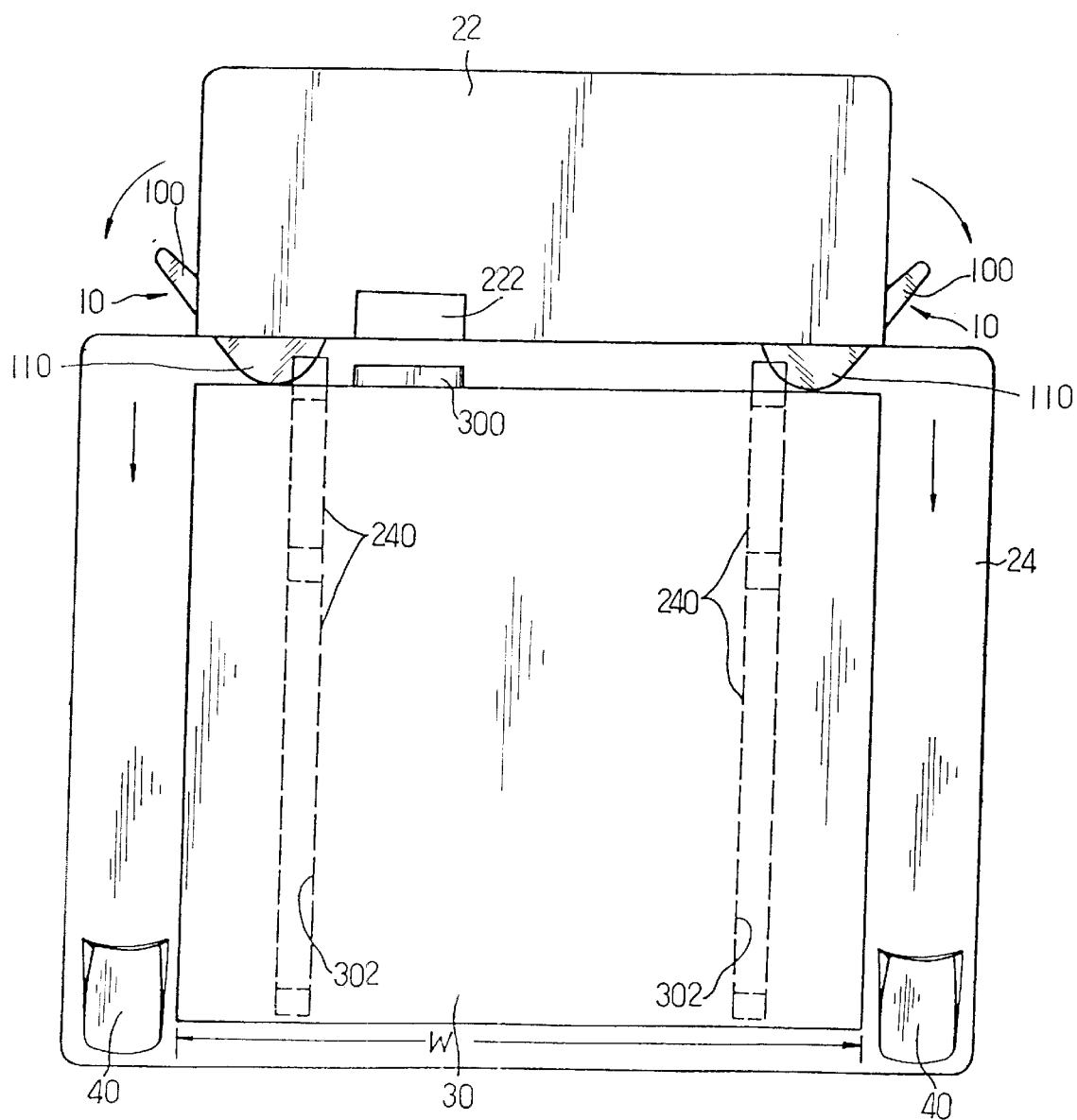
FIG. 2 shows that the pushing device of the present invention pushes the portable computer.
Figure 3:
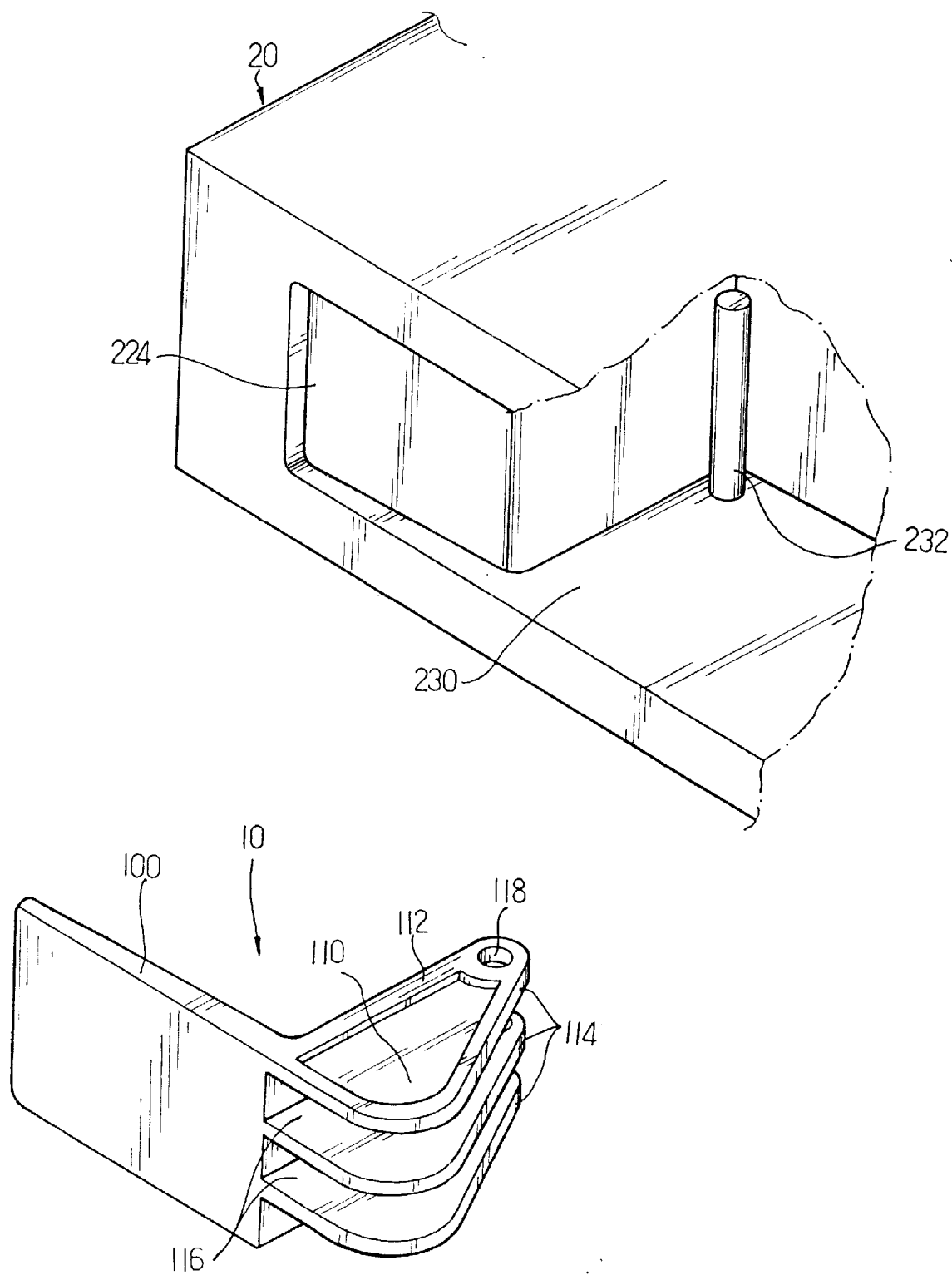
FIG. 3 is a perspective exploded view of the pushing device and a part of the expansion device of the present invention.

Referring to FIG. 3, each side of the housing 220 is partitioned by a partitioning plate 224 to form an independent receiving chamber 230 which is not communicated with the internal chamber of the housing 220 for receiving the transmission interface. In the chamber 230 is disposed a pivot member 232 which is a pivot post in this embodiment. The outward pushing device 10 is composed of a handle section 100 and a pushing section 110 connected with each other in a substantially L-shaped pattern. The handle section 100 is a plate body and the pushing section 110 is formed by a plate body 112 and three pushing plates 114 connected with each other. The adjacent pushing plates 114 are spaced by a gap 116. The free end of each Pushing plate 114 outward Projects in a convex pattern. The end edge of the pushing section 110 is disposed with a pivot hole 118. Via the pivot hole 118 and the pivot post 232, the pushing device 10 is pivotally connected with the expansion device 20. Referring to FIG. 2, when the handle section 110 is shifted away from the chamber 230, the pushing section 110 protrudes beyond the seat body 24.

Please refer to FIG. 1. In order to more save the strength for connecting the portable computer 30 on the seat body 24 with the expansion device 20, the seat body 24 is disposed with two parallel slide rails 240. Referring to FIG. 2, the bottom of the portable computer 30 is correspondingly disposed with two parallel channels 302, whereby the portable computer 30 contacts with the expansion device 20 only at the channels 302 and the slide rails 240. Therefore, the frictional force therebetween is reduced and a user can more easily push and connect the portable computer 30 with the expansion device 20.

Figure 4:
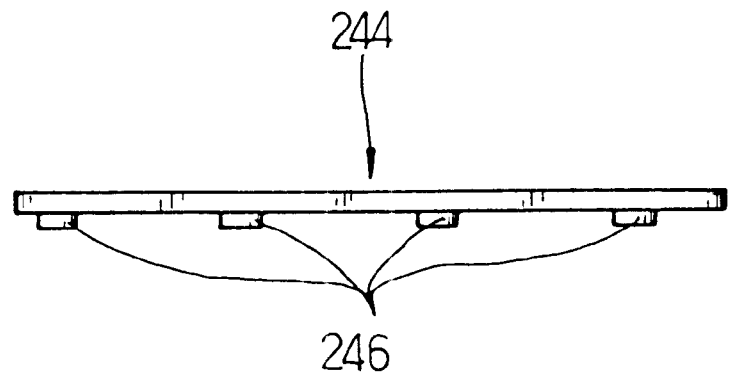
FIG. 4 is a side view of the insertion strip of the present invention.

Please refer to FIG. 1. In order to be applicable to portable computers with different pitches of the channels 302, the seat body 24 is disposed with multiple parallel rows of insertion holes 242 and two insertion strips 244 for inserting into the insertion holes 242. The insertion strips 244 can be inserted into two insertion holes 242 with different pitches to form two slide rails 240. Therefore, the seat body 24 is applicable to portable computer 30 with different channel pitches. Referring to FIG. 4, the bottom of the insertion strip 244 is disposed with block bodies 246 corresponding to the insertion holes 242 with a slightly larger size. In use, the insertion strips 244 can be easily inserted into the insertion holes 242 at different positions.

Please further refer to FIG. 2. When it is desired to withdraw the portable computer 30 from the expansion device 20, the handle sections 100 of the pushing device 10 are outward shifted so as to rotate the pushing sections 110 out of the chamber 230. Accordingly, the pushing sections 110 via the torque push the portable computer 30 away from the pushing device 10. The Pushing device 10 has quite simple structure and the expansion device 20 is only equipped with a simple pivot member so that the components are less and the assembly can be easily achieved. In the case that the force exerted onto the Pushing device 10 by the user is not unified, because the outer edge of the pushing section 110 is arched, the portable computer 30 will be stably rejected out of the expansion device 20 almost at the same speed.

Figure 5:
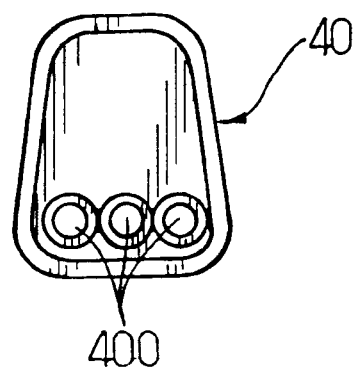
FIG. 5 is a bottom view of the guiding member of the present invention.

Referring to FIG. 2, in order to more accurately place the portable computer 30 onto the slide rails 240 of the seat body 24, each side of the seat body 24 is disposed with a guiding member 40. The distance between the guiding members 40 is slightly larger than the width W of the portable computer 30. The user only needs to align left and right ends of the portable computer 30 within the guiding members 40 for aiming the channels 302 at the slide rails 240. In this embodiment, the guiding member 40 is a block body. Referring to FIG. 5, the bottom of the guiding member 40 is disposed with multiple fixing holes 400 corresponding to the fixing position of the seat body 24. When the guiding members 40 are fixed on the seat body 24 via fixing holes 400 of different positions, the distance between the guiding members 40 is changed so that the guiding members 40 can be adjusted to guide Portable computers 30 with different widths W.

Please refer to FIGS. 1 and 2. In use, the portable computer 30 will generate great amount of heat. Especially, when the portable computer 30 is used with the expansion device 20, the execution speed of the portable computer 30 will be increased. Therefore, more heat will be generated than that of the solely used portable computer. In order to radiate the heat out of the portable computer 30, the pushing section 110 of the pushing device 10 is disposed with three pushing plates 114 at intervals 116. Referring to FIG. 3, through the intervals 116, the heat generated from the back side of the Portable computer 30 can be radiated out of the portable computer 30 (as shown by the arrow) so as to enhance the execution efficiency thereof.

It should be noted that the above description and accompanying drawings are only used to illustrate some embodiments of the Present invention, not intended to limit the scope thereof. Any modification of the embodiments should full within the scope of the present invention.

What is claimed is:

1. An outward pushing device and an expansion device adapted to the outward pushing device, comprising:
   an expansion device disposed with an electrically connecting unit having an input port for electrically connecting with a portable computer;
   at least one outward pushing device pivotally connected with at least one lateral edge of the expansion device, the pushing device including a handle section and a pushing section connected with each other, whereby after the pushing device is pivotally connected with the expansion device, by means of rotarily shifting the handle section, the pushing section is protruded from one side of the input port of the electrically connecting unit to push the portable computer away from the expansion device; and
   an independent receiving chamber is formed on at least one side of the electrically connecting unit of the expansion device, the pushing device being pivotally disposed in the receiving chamber, the pushing section of the pushing device being formed by a plate body and multiple pushing plates connected therewith, the pushing plates being spaced at intervals for dissipating the heat generated by the portable computer outside.

2. An outward pushing device and an expansion device adapted to the outward pushing device, comprising:
   an expansion device disposed with a seat body and an electrically connecting unit having an input port for electrically connecting with a portable computer, the seat body serving to retain the portable computer;
   at least one outward pushing device pivotally connected with at least one lateral edge of the expansion device, the pushing device including a handle section and a pushing section connected with each other, whereby after the pushing device is pivotally connected with the expansion device, by means of rotarily shifting the handle section, the pushing section is protruded from one side of the input port of the electrically connecting unit to push the portable computer away from the expansion device; and
   an independent receiving chamber is formed on at least one side of the electrically connecting unit of the expansion device, the pushing device being pivotally disposed in the receiving chamber, the pushing section of the pushing device being formed by a plate body and multiple pushing plates connected therewith, the pushing plates being spaced at intervals for dissipating the heat generated by the portable computer outside.

3. An outward pushing device and an expansion device adapted to the outward pushing device, comprising:
   an expansion device disposed with a seat body and an electrically connecting unit having an input port for electrically connecting with a portable computer, the seat body serving to retain the portable computer;
   at least one outward pushing device pivotally connected with at least one lateral edge of the expansion device, the pushing device including a handle section and a pushing section connected with each other, whereby after the pushing device is pivotally connected with the expansion device, by means of rotarily shifting the handle section, the pushing section is protruded from one side of the input port of the electrically connecting unit to push the portable computer away from the expansion device; and
   the seat body is disposed with at least one slide rail and the bottom of the portable computer is correspondingly disposed with a slide channel, whereby the portable computer contacts with the seat body of the expansion device only at the slide channel and the slide rail so that the frictional force therebetween is reduced and the strength for pushing the portable computer is saved; and
   wherein the slide rail of the seat body is adjustable and composed of multiple rows of insertion holes and at least one insertion strip for inserting with the insertion holes, the bottom of the insertion strip being disposed with block bodies for inserting into the insertion holes with different pitches to be applicable to portable computer with different pitches of the slide channels.

* * * * *